United States Patent [19]

Crownshaw

[11] Patent Number: 4,622,197
[45] Date of Patent: Nov. 11, 1986

[54] APPLYING THERMOPLASTICS SLEEVE TO CRUSH RESISTANT TUBING

[75] Inventor: John C. Crownshaw, Sawbridgeworth, England

[73] Assignee: Standard Telephones and Cables Public Limited Company, London, England

[21] Appl. No.: 655,425

[22] Filed: Sep. 28, 1984

[30] Foreign Application Priority Data

Oct. 1, 1983 [GB] United Kingdom ............... 8326371

[51] Int. Cl.⁴ ............................................. B29C 63/20
[52] U.S. Cl. ................................ 264/230; 264/342 R; 264/516; 264/570; 264/DIG. 50
[58] Field of Search ............... 264/230, 505, 506, 512, 264/516, 570, 342 R, 348, DIG. 50

[56] References Cited

U.S. PATENT DOCUMENTS

| 4,084,307 | 4/1978 | Schultz et al. | 29/460 |
| 4,207,364 | 6/1980 | Nyberg | 428/36 |
| 4,304,616 | 12/1981 | Richardson | 156/86 |
| 4,404,010 | 9/1983 | Bricheno et al. | 65/4.2 |
| 4,460,820 | 7/1984 | Matsumoto et al. | 219/385 |

Primary Examiner—Donald Czaja
Assistant Examiner—Mary Lynn Fertig
Attorney, Agent, or Firm—Kerkam, Stowell, Kondracki & Clarke

[57] ABSTRACT

In a submarine cable optical fibre regenerator housing a copper tail pipe (optionally with a brass end section incorporating an anti-extrusion profile for fitting inside a gland) is provided with a tight fitting length of thermoplastics sleeving by collapsing a thermoplastics preform down onto the tail pipe using heat and air pressure applied to the outside of an elastomeric tube into which the tail pipe and preform have been inserted.

4 Claims, 3 Drawing Figures

APPLYING THERMOPLASTICS SLEEVE TO CRUSH RESISTANT TUBING

BACKGROUND OF THE INVENTION

This invention relates to a method of providing a thermoplastics sheath or sleeve tightly fitting around a length of crush resistant tubing.

An application for which this method is particularly suited is in the provision of electrically insulating plastics sheathing around the tail pipe of a submarine cable optical fibre regenerator housing. Such a tail pipe provides a hydrostatic pressure resistant duct from a gland in the wall of the regenerator pressure resistant vessel to a tie-off position to which the submarine cable itself is attached. The duct must be capable of withstanding the hydrostatic pressures existing at the ocean bed without crushing the optical fibres it contains, it must also provide an electrical connection for powering the regenerator and it must be adequately mechanically protected and electrically insulated from sea water.

In a conventional electrical regime submarine cable the electrical analogue of the tail pipe is typically provided by a length of stranded copper conductor encased in a thick polythene sheath. The sheathing in this instance can satisfactorily be provided by conventional extrusion coating. Conventional extrusion coating can also be used for applying plastics sheathing to tubing which is to form the tail pipe of a submarine cable optical regenerator, but this is not the preferred process. The reason is at least in part because it is desired to subject the tubing to as little bending as possible prior to forming it into its final working configuration, whereas implicit in a conventional extrusion process is the production of long continuous lengths that require reeling and unreeling. A further consideration is that by working in discrete lengths it is possible to provide one end of the tube with a special configuration designed to reduce the tendency for the sheathing to extrude under hydrostatic pressure through a gland into which that end of the tubing is fitted.

SUMMARY OF THE INVENTION

According to the present invention there is provided a method of providing a plastics sheath fitting tightly around a length of crush resistant tubing, wherein a loose fit thermoplastics sleeving preform is placed around the tubing and the resulting assembly is placed in a mould within the bore of a tubular elastomeric mould lining, and wherein the preform is collapsed tightly on to the tubing by applying heat to the preform to soften it and hydrostatic pressure to the outer surface of the lining to compress the preform radially while extrusion of the preform in the axial direction is prevented by collars fitted around the tubing and secured in abutting relationship with the preform ends.

BRIEF DESCRIPTION OF THE DRAWINGS

There follows a description of the method, embodying the invention in a preferred form, of providing a polythene sheath fitting tightly around a length of crush resistant copper tubing. The description refers to the accompanying drawings in which.

DETAILED DESCRIPTION OF PREFERRED EMBODIMENTS

Figure 1:
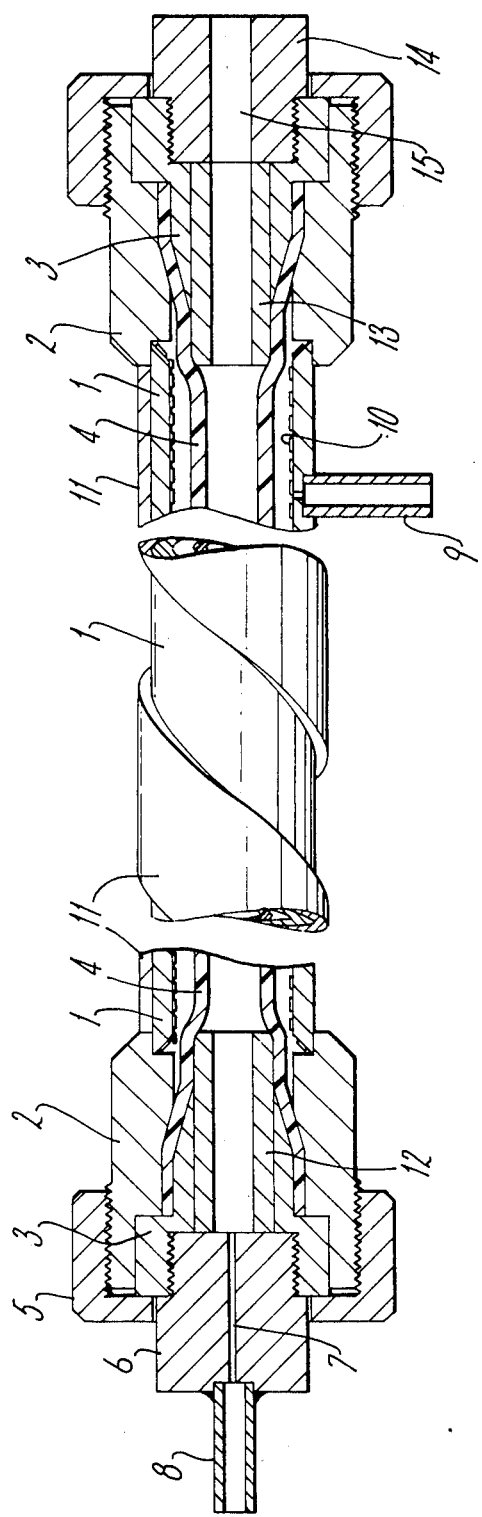
FIG. 1 depicts a part sectioned diagram of the apparatus employed.

A rigid metal mould housing tube 1, typically between one and two metres long, 25.4 mm (1 inch) outside diameter, and made of brass, is secured at each end to a termination 2 that co-operates with an annular inner member 3 to form a clamp for holding the end of an elastomeric mould lining tube 4 that threads the mould housing tube. Each end of the mould lining, which is typically made of silicone rubber, is held between complementary tapers on the termination 2 and inner member 3 which are urged together by means of an end cap 5 in screw threaded engagement with the termination 2. An end plug 6 engaged in the outer end of one of the annular inner members 3 serves to blank it off except for the presence of a bore hole 7 communicating with a delivery pipe 8.

A second delivery pipe 9 communicates with the interior of the mould housing tube 1, which optionally is lined with a metal braid 10 to prevent the possibility of the mould lining sealing off this second delivery pipe. An electrical heating tape 11 is wrapped helically around the outside of the tube.

Resting against the inner end of the end plug 6 is a collar 12. The bore of this collar 12 is dimensioned to fit around the end of length of the copper tubing 20 (FIG. 2) that is to be provided with a moulded polymer sheath from a length of polythene sleeving 21 (FIG. 2) somewhat shorter than the length of the copper tubing 20. The external diameter of the collar 12 is matched with that of the polythene sleeving 21. The copper tubing 20 typically has an external diamter of 6.4 mm (0.25 inch) and a wall thickness of 1.22 mm (18 swg). The polythene sleeving 21 has an internal diameter of 6.5 mm (0.255 inch) and an external diameter of 12.7 mm (0.5 inch). For this size of polythene sleeving a suitable size of mould lining 4 is one having a 10 mm bore and a 2 mm wall thickness. At the other end of the tube 1 is a second collar 13 similar to collar 12. This is backed by a second end plug 14 which is provided with a central bore 15 large enough to accommodate the passage therethrough of the copper tubing 20.

Figure 2:
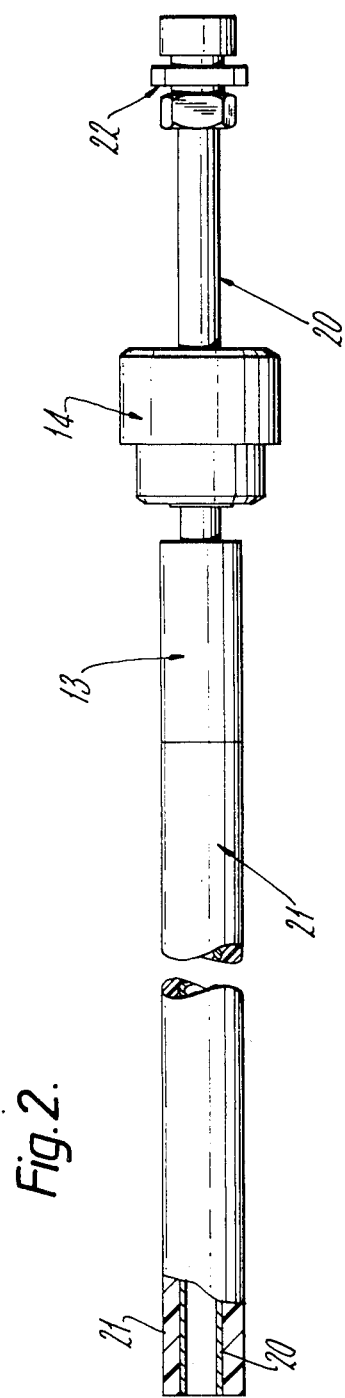
FIG. 2 depicts a tube and its thermoplastics preform ready for insertion into the moulding apparatus.

The copper tubing 20 is inserted into the polythene sleeving 21 as depicted in FIG. 2 so that their ends are flush at one end. Then the collar 13 and end plug 14 are fitted over the other end of the copper tubing 20 before the fitting of a blanking fitting or valve 22. Then, with the delivery pipe 8 connected to an air pressure line (not shown) providing a pressure of about 40 Kilopascals (60 psi), and with flow through the tubing prevented by the blanking fitting 22, the flush ends of the tubing 20 and sleeving 21 are introduced into the open end of the mould housing tube. For this operation the tubing 20 is held immediately behind the end plug 14 so that the sleeving 21 is not pushed back along the tubing 20. The introduction of the sleeving into the end mould liner 4 blocks the free passage of air down the liner. The resulting build-up of pressure within the liner causes it to expand until its bore is large enough to permit entry of the sleeving 21. Thus the tubing and its sleeving are enabled to be pushed, without requiring force other than that to resist the air pressure, into the liner until the sleeving comes up against the collar 12. The end cap 14 is next screwed into the back of the inner member 5 of the liner end clamp before removing the air pressure line from delivery pipe 8 and the blanking fitting 22 from the copper tubing. Then the copper tubing is pushed fully home through the sleeving until its end passes right through the bore of collar 12 to bottom against the inner face of end plug 6. Finally an air pressure line (not shown) providing a pressure of about 40 Kilopascals (60 psi) is connected to delivery pipe 9 to apply moulding pressure to the outer curved surface of the polythene sleeving 21.

The assembly is now ready for the application of heat to soften the polythene and mould it tightly around the copper tubing. This heating is provided by the heating tape 11 wrapped around the housing tube 1. A typical heating schedule involves heating to a temperature of about 130° C. and cooling over a period of about 60 minutes. During the moulding operation the volume of heat-softened plastics material is contained by the lining 4, the copper tubing 20, and the two collars 12 and 13 which serve to prevent the plastics from being extruded axially.

At the end of the heating schedule the air supply is removed from delivery pipe 9 to release the moulding pressure, and an air supply is reconnected to delivery pipe 8. Optionally the blanking fitting 22 may be left off initially in order to provide preferential cooling of the moulding from the inside. Then, with the blanking fitting fitted and end cap 14 loosened, the build-up of air pressure causes the lining 4 to separate from the polythene. Once air begins to leak past the end cap 14 it is removed, whereupon the air pressure will blow the copper tubing, with its moulded sleeving, out of the assembly.

Figure 3:
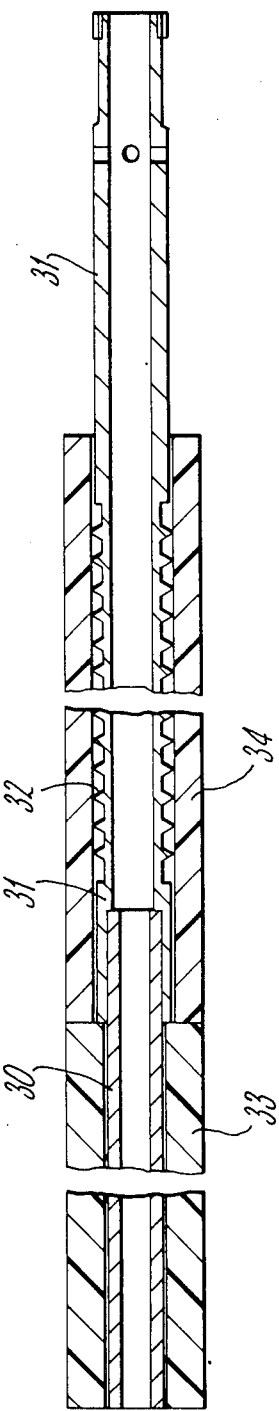
FIG. 3 depicts an alternative form of tube and preform in which the tube is formed in two parts one of which incorporates an anti-extrusion profile.

The tubing 20 of FIG. 2 has the same uniform cross section throughout its length, but this is not a necessary characteristic for the performance of this invention, and FIG. 3 depicts an alternative form of tubing in which a first part of crush resistant copper tubing 30 is brazed into the end of a second part 31 of brass which is provided with one or more ribs 32 extending around the tubing and designed to inhibit axial extrusion of the plastic when that part of the tubing is subsequently located in a gland capable of withstanding a high differential in hydrostatic pressure. The ribs may be individual circumferential ribs, or a single rib in the form of a helix may be employed. In this case the external diameter of the first part 30 of the tubing is slightly less than that of the second part, and so the plastics sleeving which is to be moulded on to the tubing is also made in two parts 33 and 34. Both sleeving parts have the same external diameter, but part 33 has the greater wall thickness to match the reduced diameter of tubing part 30. (Alternatively a single counterbored part may be used in place of the two parts 33 and 34.) The two collars 12 and 13 will similarly have slightly different diameter bores.

I claim:

1. A method of providing a polythene sheath fitting tightly around a crush resistant electrically conductive metal tail pipe of a regenerator of a submarine optical fibre cable, comprising placing a loose fit polythene sleeving preform around the tail pipe, placing the resulting assembly in a mould within the bore of a tubular elastomeric mould lining, applying heat to the preform to soften it and hydrostatic pressure to the outer surface of the lining to compress the preform radially and to collapse the preform tightly onto the tail pine while preventing extrusion of the preform in the axial direction by collars fitted around the tail pipe and secured in abutting relationship with the preform ends, and subsequent to the heating of the preform, directing a forced draft through the tail pipe bore to cool preferentially the surface of the preform in contact with the tail pipe.

2. A method as claimed in claim 1, wherein the insertion of the assembly into the lining and the subsequent removal of the assembly from the lining is facilitated by temporarily pressurising the inside of the lining.

3. A method as claimed in claim 1, wherein the tail pipe is stepped in external diameter and wherein the preform is composed of two parts butted together in the region of the step, wherein the two parts of the preform have substantially the same external diameter, and one has an internal diameter that is a loose fit around the smaller diameter portion of the tail pipe while the other has an internal diameter that is a loose fit around the larger diameter portion.

4. A method as claimed in claim 3, wherein the insertion of the assembly into the lining and the subsequent removal of the assembly from the lining is facilitated by temporarily pressurising the inside of the lining.

* * * * *

UNITED STATES PATENT AND TRADEMARK OFFICE
CERTIFICATE OF CORRECTION

PATENT NO. : 4,622,197
DATED : November 11, 1986
INVENTOR(S) : John C. Crownshaw It is certified that error appears in the above-identified patent and that said Letters Patent is hereby corrected as shown below:

Claim 1, Line 22, the word "pipe" should be substituted for the word "pine".

Signed and Sealed this

Third Day of March, 1987

Attest:

DONALD J. QUIGG

*Attesting Officer*  *Commissioner of Patents and Trademarks*